March 5, 1968     W. A. HEIDMAN, JR     3,372,373
AUTOMOBILE DOOR OPERATED SAFETY SIGNAL
Filed Sept. 11, 1964     3 Sheets-Sheet 1
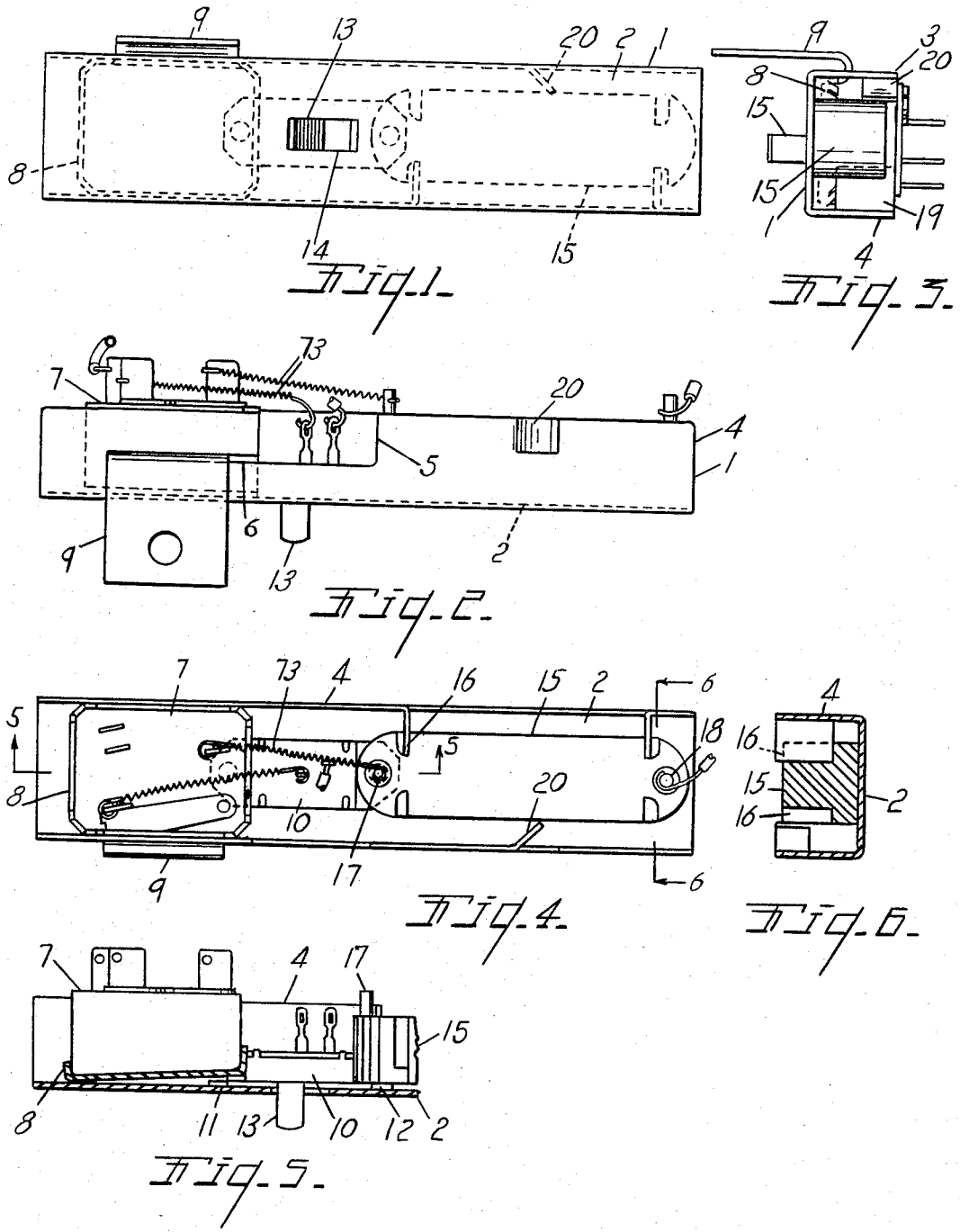
INVENTOR.
William A. Heidman Jr.
BY
ATTORNEY.

March 5, 1968 W. A. HEIDMAN, JR 3,372,373
AUTOMOBILE DOOR OPERATED SAFETY SIGNAL
Filed Sept. 11, 1964
3 Sheets-Sheet 2
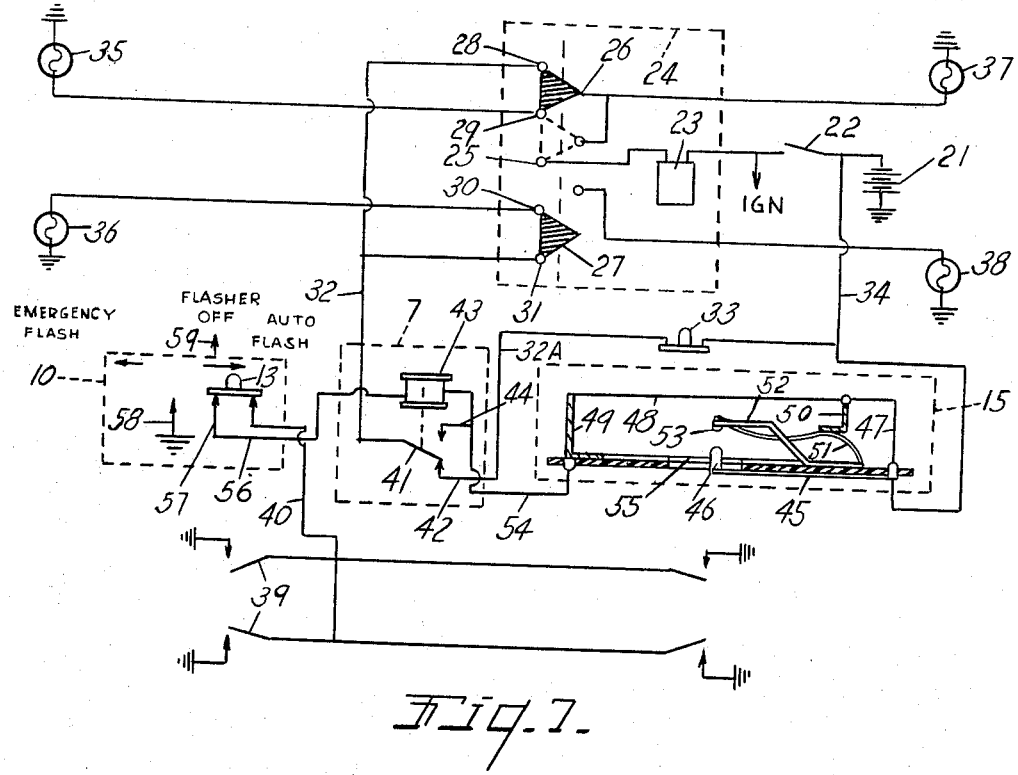
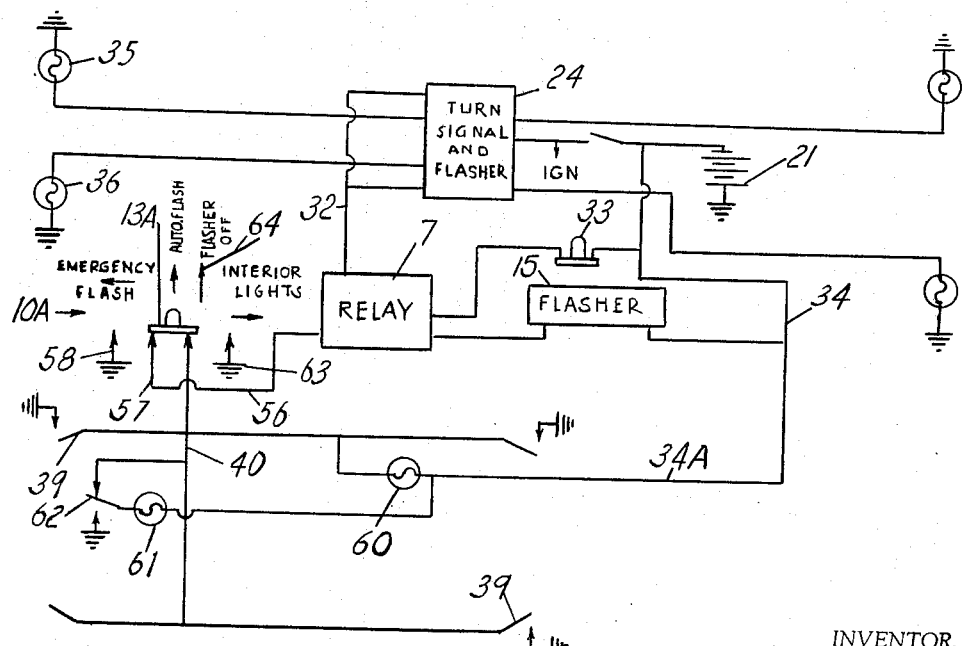
INVENTOR.
William A Heidman Jr.
BY
ATTORNEY.

March 5, 1968  W. A. HEIDMAN, JR  3,372,373

AUTOMOBILE DOOR OPERATED SAFETY SIGNAL

Filed Sept. 11, 1964  3 Sheets-Sheet 3

INVENTOR.
William A. Heidman Jr.
BY
ATTORNEY.

3,372,373
AUTOMOBILE DOOR OPERATED
SAFETY SIGNAL
William A. Heidman, Jr., 1139 Lakeside Drive SE.,
Grand Rapids, Mich. 49506
Filed Sept. 11, 1964, Ser. No. 395,679
13 Claims. (Cl. 340—74)

This invention relates to improvements in automobile door operated safety signal. The principal objects of this invention are:

First, to provide a switch assembly which can be easily attached and connected to the wiring of an automobile and particularly the brake and turn signal portions thereof either as an attachment or as original equipment to permit selective automatic flashing of the stop lights as a warning signal when any door is opened or when a manual switch is actuated with the door closed.

Second, to provide a novel and inexpensive assembly and mounting for a thermally actuated flasher switch, manual selector switch and solenoid operated relay switch which can be easily attached to the instrument panel of an automobile and electrically connected to the turn signal, stop light switch and battery circuits of the automobile to cause the stop light to flash as a warning when any door is open.

Third, to provide a novel warning signal circuit which may be connected to existing ground return circuits of the automatic door operated lights of an automobile or to two wire door operated switches of a courtesy light circuit and selectively adjusted by a manual switch to flash the stop lights automatically when a door is opened or without opening a door or to disconnect the warning flasher when it is desired to leave a door open.

Fourth, to provide a switch and control assembly having the foregoing capabilities and advantages which does not interfere with the normal operation of the brake or stop light and turn signal circuits found in automobiles when in normal operation but which will automatically disconnect normal brake switch operation if a door is opened to override the action of the brake switch.

Other objects and advantages of the invention will be apparent from a consideration of the following description and claims. The drawings, of which there are three sheets illustrate a highly practical form of mounting assembly for the physical elements of the thermally actuated flasher, manually operable switch and solenoid operated switch and three alternative circuit connections of the switch assembly to the existing wiring system of different automobiles.

FIG. 1 is a front elevational view of the emergency or warning flasher switch assembly adapted for mounting as an attachment to the instrument panel of existing automobiles.

FIG. 2 is a top plan view of the attachment assembly shown in FIG. 1.

FIG. 3 is a projected end elevational view of the assembly shown in FIG. 2.

FIG. 4 is a back side elevational view of the switch assembly.

FIG. 5 is a fragmentary cross sectional view taken along the plane of the line 5—5 in FIG. 4.

FIG. 6 is a cross sectional view taken along the plane of the line 6—6 in FIG. 4.

FIG. 7 is a schematic wiring diagram of the automatic warning flasher circuit of the invention connected to the turn signal and stop light circuits of the automobile having ground return door operated switches.

FIG. 8 is a schematic wiring diagram of a first modified form of the warning flasher circuit shown in FIG. 7 applied to an automobile having door operated switches which also actuate courtesy or interior lights when a door is opened.

Figure 9:
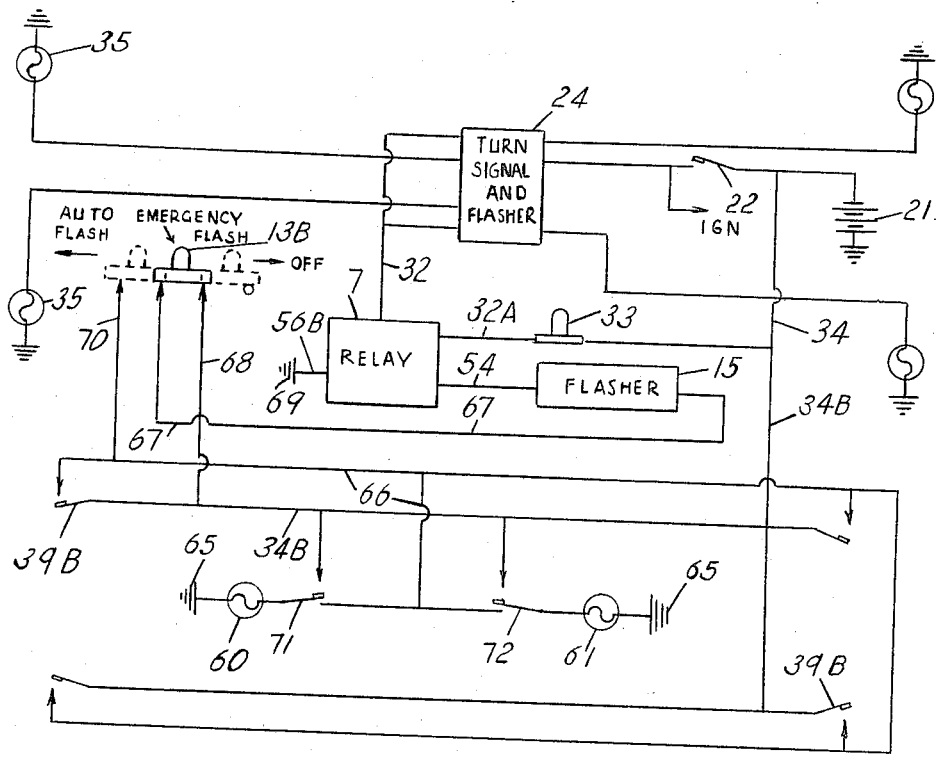
FIG. 9 is a schematic wiring diagram of a second modified connection of the warning flasher circuit connected to the existing wiring system of an automobile in which the interior courtesy lights are actuated by two wire door operated switches as distinguished from the single wire ground return door switches shown in FIG. 8.

The physical or mechanical assembly of the controls for the emergency and automatic warning flasher circuit of the invention are shown in FIGS. 1 to 6 in a form adapted to be added as an attachment to existing automobiles. The assembly consists of a channel shaped body 1 of sheet material or other suitable supporting material having a front wall 2 with a rearwardly turned upper flange 3 and lower flange 4. The top flange has a first rectangular cut-out 5 formed therein from its rear edge with a slot 6 opening laterally from the bottom of the cut-out. Positioned within the end of the channel shaped body is a relay or solenoid operated switch enclosed in a case 7 and mounted in a metallic support 8 having a reversely turned flange 9 projecting upwardly through the slot 6 and forwardly of the body 1. The relay and its base 8 are installed in the body by passing the flange 9 into the cut-out 5 and then laterally into the slot 6.

Positioned adjacent the inner end of the relay 7 is a manually operable switch body 10 mounted in a base having laterally projecting tongues 11 and 12. The tongue 11 is positioned under and retained in place by the base 8 of the relay while a switch control button 13 projects forwardly through a rectangular opening 14 in the front wall 2 of the assembly body. The other end flange or ear 12 of the manual switch is retained in place against the back side of the front wall 2 by one end of a thermally actuated flasher switch enclosed in a molded body 15. The end of the body 15 also holds the body 10 of the manual switch laterally against the base 8 of the relay switch.

The body 15 of the thermal switch is molded with inwardly opening notches or slots 16 at each side and at each end of the back side of the switch body. Terminal pins 17 and 18 project from the rear face of the thermal switch body. The bottom flange 4 of the assembly supporting body 1 has two upwardly turned flanges 19 which project into the lower slots 16 and against the bottoms of the slots to hold the body 15 against the rear side of the front wall 2. The spacing between the inner edges of the flange 19 and the top flange 3 is sufficient to permit the thermal switch body to be slipped into the channel section of the assembly body 1 and then slid downwardly underneath the flanges 19. The thermal switch is then located in place by bending a flange 20 downwardly from the top wall 3 as appears in FIGS. 1, 2 and 3.

The relay switch 7, manual switch 10 and thermally actuated switch 15 are commercially available elements, the circuit connections of which will be described in detail presently. The thermally actuated switch in particular is an inexpensive switch which opens and closes a major or relatively heavy current circuit in response to heating and cooling of a wire through which a secondary or low wattage current is passed.

FIG. 7 illustrates schematically a first circuit connection of the switch elements shown in FIGS. 1 to 6. A conventional wiring system of automotive vehicles is shown in which a battery 21 is connected through the ignition switch 22 to the standard flasher 23 of a turn signal switching system enclosed in the dotted outline 24. The turn signal circuit, which is old, consists of a central contact 25 connected to the flasher 23 and adapted to be engaged by one or the other of the triangular left turn contact 26 or right turn contact 27 when the contacts are moved to engage either turn signal. When in the neutral position as illustrated the terminal 26 connects terminals 28 and 29 and terminal 27 connects terminals 30 and 31. Terminals 28 and 31 are connected in parallel to a conductor 32 which in the standard installation in automobiles is connected through a brake operated switch 33 and conductor 34 to the positive side of the battery. The terminals 26 and 27 function to connect the terminals 28, 31 and the brake switch to stop lights 35 and 36 having a ground return to the battery as is well known. Front turn signal lights 37 and 38 are actuated by the turn signal control in the normal manner.

The normal wiring circuit of most automobiles includes door operated switches 39 which are closed on ground return terminals when any door is open and the switches are connected in parallel from a conductor 40. In connecting the emergency signal of the invention to the existing wiring system of the automobile it is only necessary to break the conductor 32 to the brake switch and connect the conductor 32 from the turn signal to the moving contact 41 of the relay switch 7. The other end of the broken conductor 32A is connected to the normally closed terminal 42 of the relay 7 switch. Thus when the coil 43 of the relay is deenergized the brake or stop light circuit functions in the usual manner. However, when the coil 43 is energized the moveable terminal 41 makes contact with alternate terminal 44 and the brake or stop light circuit is disconnected. The coil 43 is adapted to be energized from the thermally actuated switch 15 which has a first conductor plate 45 and fixed contact 46 connected to the battery through the previous conductor 34. The plate 45 is also connected through a low capacity wire 47 to one end of a stretchable thermally responsive wire 48 having one end fixedly and electrically connected to the conductor 49 and having its other end connected to the insulating moveable support 50. The support 50 is mounted on a curved springable conductor 51 and is connected to a further springable support 52 and moveable contact 53 so that extension of the wire 48 on being heated opens the contact 53 from the fixed contact 46. A small amount of current flows through the wire 48 and conductor 54 to the coil 43 and other alternate contact 44. When the wire 48 is heated the flow of current therethrough, it expands forcing conductor 51 to close the contacts 53 and 46 at which time a conducting path is established through the conductor 51 and plate 55 to the conductor 54 and a larger current flows through the conductor 54 following the path of least resistance so that less current flows through wire 48, thus causing wire 48 to cool. As stated the thermally operated switch is a commercially available item and so it is not described in greater detail, it being sufficient to note that the switch will intermittently pass a relatively strong current and a relatively small current either of which is sufficient to actuate the coil 43. However, the lesser current passed by the wire 48 is insufficient to activate the stop lights 35 and 36.

The coil 43 is connected to be selectively energized through conductor 56 connected to the center terminal 57 of manual switch 10. The moveable contact 13 of the switch may be moved to the position shown in FIG. 7 to connect with a terminal connected to the conductor 40 and the door switches 39. In this setting, opening of any door will provide a ground return to the circuit through the coil and the thermal switch 15 and the brake lights 35 and 36 will both flash automatically as a warning as persons are entering the automobile.

Alternatively, the switch 13 can be moved to connect terminal 57 and grounded terminal 58 to actuate the flashing signal of both tail lights with all doors closed. An intermediate position of the switch indicated at 59 turns the flasher circuit off. Note that in the "off" position of switch 10, coil 43 as well as flasher 15 are deenergized and switch 41 closes on conductor 42 for continued normal operation of the stop signals by brake switch 33.

The circuit shown in FIG. 8 is modified slightly in the connections to the switch 10A and by the inclusion of interior courtesy lights 60 and 61 in the standard wiring of the automobile. Elements having the same function as in FIG. 7 retain the same reference numerals. Conductor 34 is extended at 34A to the interior lights. Light 60 is connected directly to conductor 40 while light 61 is connected through switch 62 alternatively to conductor 40 or directly to ground. Manual switch 13A will selectively connect contacts 57 and 58 for emergency flashing of the stop lights as will 57 with 40 for automatic flashing of a warning upon opening any door. An additional new position of switch 13A will connect conductor 40 with ground 63 to turn on both interior lights while the doors are closed and disconnect the flasher signal. One or more intermediate positions 64 turn the automatic flasher off.

The modified circuit shown in FIG. 9 includes interior and courtesy lights 60 and 61 that are connected to ground at 65. The battery, through extension conductor 34B, is connected to one side of the door operated switches 39B. Switches 39B are two wire switches as distinguished from grounded switches 39 and are connected on their open or dead sides by conductor 66.

Switch 13B is selectively moveable to connect conductor 67 from the flasher 15 to contact 68 connected to conductor 34B, conductor 68, switch 13B, conductor 67, flasher with the doors closed. The circuit is from conductor 34B, conductor 68, switch 13B, conductor 67, flasher 15, relay 7 to conductor 56B which is grounded at 69. Alternate position of switch 13B connects conductor 67 to contact 70 that is connected to conductor 66 so that the flasher will operate automatically upon opening any door.

Interior switches 71 and 72 permit selective lighting of interior lights 60 and 61, respectively. This is not novel but is illustrated to show that such switches will not interfere with the operation of the warning flasher circuits in any of their adjusted positions.

In the attachment form of the flasher shown in FIGS. 1 to 5 it is expedient to connect the existing terminals of the commercial parts by springs 73 which may be quickly attached without soldered connections and which assist in preventing rattle of the parts. In either the attachment form illustrated or any of the circuits built in as original equipment it is only necessary to provide lead wires from the relay corresponding to conductors 32 and 32A for connection to the severed ends of the stop light wire from the brake switch, one or two lead wires from the manual switch corresponding to conductors 40 or 68 and 70, and one lead wire corresponding to conductor 34 from the thermal flasher in FIGS. 7 and 8, or 67 in FIG. 9. All other connections can be made directly between the flasher, relay and switch or to ground through the relay or manual switch mounting.

It is further pointed out that the termal switch 15 is an example only of one commercially available flasher which may be used in the circuit. Any thermal flasher capable of passing the necessary wattage or amperage to flash the stop lights may be used. Specifically, it is not necessary for the thermal switch to pass current continuously to the solenoid while the thermal switch is energized and flashing. The thermal switch may activate the relay intermittently and each actuation thereof will actuate switch 41 to transfer control of the rear stop lights from the brake switch circuit to the flasher circuit.

It is further pointed out that the warning flasher circuit is at all times connected to the battery ahead of the ignition switch so as to be operative when a person opens the door from the outside and before the ignition switch could be turned on.

What is claimed as new is:

1. In an automotive vehicle having two exterior rear lights with one on each side of the vehicle, a battery, a first normal rear light energizing circuit including individual conductors connected separately to said two rear lights, and a selectively operable switch adapted to connect said rear light circuit including both said individual conductors through said battery, an emergency signal system comprising a thermally actuated switch adapted to alternatively and intermittently pass a relatively small and a relatively high amperage current, said small current being insufficient to effectively light said rear lights, a relay switch having a coil connected in series with said thermally actuated switch and adapted to be actuated by either said low or high amperage currents, emergency circuit means including a switch closed by the energized condition of said coil connecting said rear light circuit to said battery through said thermally actuated switch, independently of said selectively operable switch, another switch closed by the deenergized condition of said coil connecting said rear light energizing circuit to said battery through said selectively operable switch, and a second selectively operable switch arranged to connect said coil and thermally actuated switch in series through said battery to permit selective energization of said coil.

2. The automotive vehicle as described in claim 1, wherein said first selectively operable switch is a brake actuated switch.

3. The vehicle and emergency signal system as defined in claim 2 in which there is a turn signal system including a selectively operable switch arranged to connect a thermally self actuated current interrupter to a selected one of said individual conductors while disconnecting the other of said individual conductors from said brake switch, said emergency circuit means being connected to said rear light circuit through the selectively operable switch of said turn signal system.

4. The vehicle and emergency signal system as defined in claim 3 in which the current interrupter of said turn signal system is separate from said thermally actuated switch of said emergency signal system, said current interrupter having a connection to said battery controlled by an ignition switch for said vehicle, said thermally actuated switch being connected directly to said battery independently of said ignition switch.

5. The vehicle and emergency signal system as defined in claim 3 in which said vehicle has an interior light circuit including a door operated switch arranged to complete the interior light circuit through said battery when a door is opened, said second selective operable switch being arranged in one of its selected positions to connect said coil and said thermally actuated switch to said interior light circuit.

6. The vehicle and emergency signal system as defined in claim 4 in which said vehicle has an interior light circuit including a door operated switch arranged to complete the interior light circuit through said battery when a door is opened, said second selectively operable switch being arranged in one of its selected positions to connect said coil and said thermally actuated switch to said interior light circuit.

7. The vehicle and emergency signal system as defined in claim 5 in which said interior light circuit includes a lamp having one side continuously connected to said battery and with said door operated switch arranged to complete the lamp circuit through a ground return, said second selectively operable switch being engaged with said interior light circuit between said lamp and said door operated switch in the said one of its selected positions.

8. The vehicle and emergency signal system as defined in claim 5 in which interior light system includes a lamp grounded on one side and said door operated switch connects a wire connected to the battery and a wire connectible to the lamp, said second selectively operable switch being engaged with the wire of the interior light system connected to the battery in the said one of its selected positions.

9. The vehicle and emergency signal system as defined in claim 6 in which said interior light circuit includes a lamp having one side continuously connected to said battery and with said door operated switch arranged to complete the lamp circuit through a ground return, said second selectively operable switch being engaged with said interior light circuit between said lamp and said door operated switch in the said one of its selected positions.

10. The vehicle and emergency signal system as defined in claim 6 in which interior system includes a lamp grounded on one side and said door operated switch connects a wire connected to the battery and a wire connectible to the lamp, said second selectively operable switch being engaged with the wire of the interior light system connected to the battery in the said one of its selected positions.

11. In combination with the wiring system of an automobile having a rear light circuit connected to be energized through a selectively actuated switch and interior lights connectable to the battery of the vehicle and arranged to be energized through door operated switches in an interior light circuit, an emergency warning flasher signal circuit comprising a thermally self actuating current interrupter connectible to said rear light circuit, relay switch means including a relay switch element and an actuating coil for the switch element arranged to connect the switch element in series relation between said current interrupter and said rear light circuit when said coil is energized, and to connect the switch element alternatively in series relation between said selectively actuated switch and said rear light circuit when said coil is de-energized, one side of said coil being connected to said current interrupter, and a second selectively actuated switch connected to the other side of said coil, said second selectively actuated switch being arranged to selectively and individually connect said other side of said coil to a terminal connected to said interior light circuit, and a terminal connected to the opposite side of the battery from said interior light circuit.

12. The combination as defined in claim 11 in which the selectively actuated switch is actuated to closed position by operation of the vehicle brakes, and said rear light circuit includes separate rear lamps and energizing conductors connected to the lamps, and a turn signal system including a manually operable switch arranged to selectively connect either one of said conductors to an automatic current interrupter to the exclusion of the other of the conductors, said selectively actuated switch being actuated to closed position by actuation of the brakes of the vehicle and being connected to said conductors through the switch of said turn signal system.

13. The combination as defined in claim 12 in which the automatic current interrupter of said turn signal system is separate from the thermally self actuated current interrupter of said emergency warning flasher circuit.

References Cited

UNITED STATES PATENTS

| | | | |
|---|---|---|---|
| 2,321,803 | 6/1943 | Falge et al. | 340—81 X |
| 2,654,079 | 9/1953 | Ringwald | 340—81 |
| 2,761,121 | 8/1956 | Caporale | 340—52 |
| 2,802,142 | 8/1957 | Johnson | 315—84 X |
| 2,844,810 | 7/1958 | Steele | 340—74 X |
| 3,074,049 | 1/1963 | Saliba et al. | 340—81 X |
| 3,182,289 | 5/1965 | Rossi | 340—81 X |
| 3,185,961 | 5/1965 | Du Rocher | 340—74 |

THOMAS A. ROBINSON, *Primary Examiner.*

NEIL C. READ, *Examiner.*

I. J. LEVIN, *Assistant Examiner.*